(No Model.)　　　　　　　　　　　　　　2 Sheets—Sheet 1.
H. C. BEEBE.
GRAIN DRILL.
No. 347,863.　　　　　　　　　Patented Aug. 24, 1886.
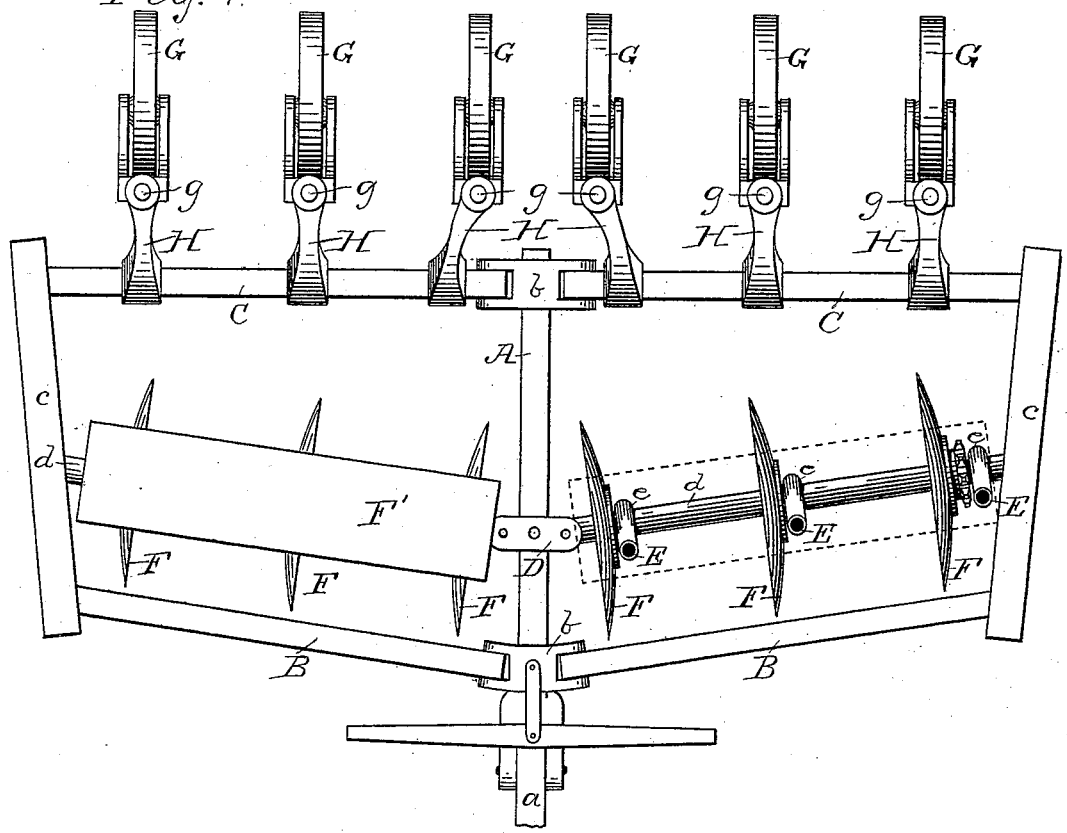
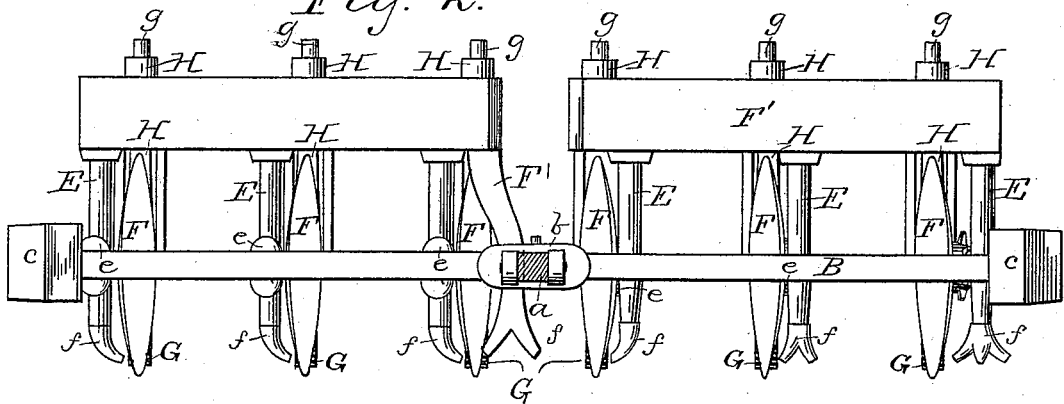
WITNESSES:　　　　　　　　　　　　　INVENTOR
Edward W. Schirach　　　　　　　　Henry C. Beebe
Chas. G. Meyer　　　　　　　　BY James H. Coyne
　　　　　　　　　　　　　　　　ATTORNEY (No Model.) 2 Sheets—Sheet 2.
H. C. BEEBE.
GRAIN DRILL.
No. 347,863. Patented Aug. 24, 1886.
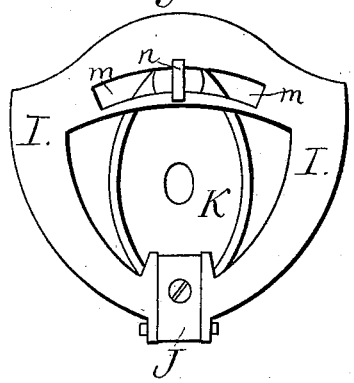
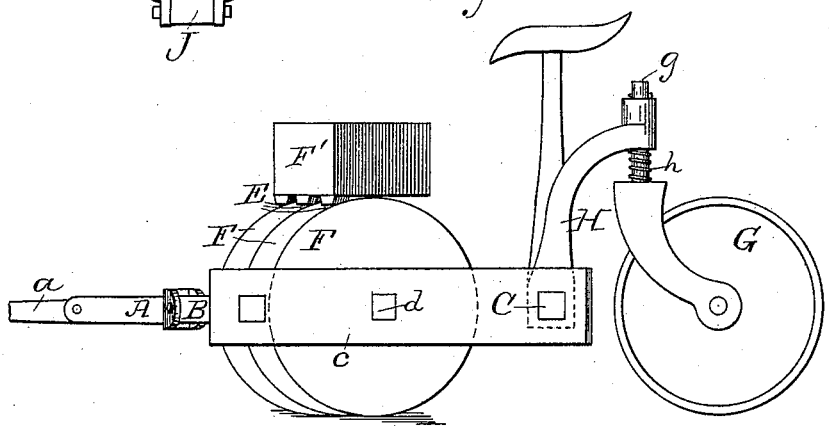
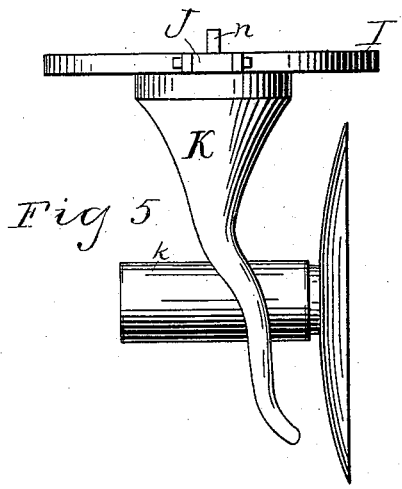
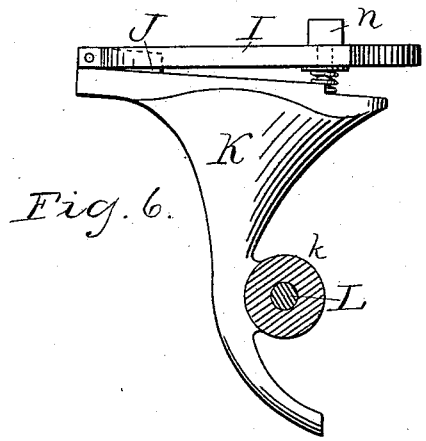
WITNESSES:
Edward W. Schurach
Chas. G. Meyer
Henry C. Beebe
INVENTOR
BY James H. Coyne
ATTORNEY

UNITED STATES PATENT OFFICE.

HENRY C. BEEBE, OF CANTON, ILLINOIS.

GRAIN-DRILL.

SPECIFICATION forming part of Letters Patent No. 347,863, dated August 24, 1886.

Application filed March 8, 1886. Serial No. 194,378. (No model.)

*To all whom it may concern:*

Be it known that I, HENRY C. BEEBE, of Canton, in the county of Fulton and State of Illinois, have invented certain new and useful Improvements in Grain-Drills; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to simple and useful improvements in grain-drills—improvements which make it unnecessary to "broadcast" except under extraordinary circumstances, and which render it possible for the drill to be easily converted into a pulverizer. This I accomplish by means of series of rotary colters arranged obliquely to the line of draft, and by means of spouts or tubes having, as preferred, single, bifurcated, or trifurcated mouths, which distribute the seed fed to said tubes from the hopper, substantially as hereinafter described, and as illustrated in the drawings, in which—

Figure 1 is a plan view. Fig. 2 is a front elevation. Fig. 3 is a side elevation; and Figs. 4, 5, and 6 illustrate a modified manner of connecting said tubes to the hopper.

Reference being had to the drawings, A represents a central longitudinal beam having pivoted to its front end, so that it can oscillate vertically, the tongue $a$. Immediately back of where the tongue $a$ is pivoted, and at its rear end, said beam is provided with bosses $b$ $b$. These bosses are provided with laterally-projecting lugs, the lugs of the forward boss being turned obliquely to the rear. Between the lugs of the forward boss $b$ are pivoted the front transverse bars, B, having a slight obliquity to the rear, and between the lugs of the rear boss $b$ are pivoted the rear transverse bars, C. The transverse bars are placed on both sides of beam A, and their outer ends are connected by the longitudinal timbers $c$, as shown.

Secured on beam A between bosses $b$ $b$, but nearer the forward one, is a clevis, D, which is adjustable longitudinally on said beam by means of vertical holes therein and a pin which is dropped through suitable perforations in said clevis into said holes. This clevis is provided with two horizontal lugs, between which the contiguous end of the axles $d$ $d$ are pivoted. The axles $d$ $d$ are preferably parallel with the transverse bars B in front of them, and have their outer ends secured in the timbers $c$ $c$.

Located and secured at regular intervals on axles $d$ are collars $e$, which have the grain-distributing tubes E permanently secured to or made integrant with them. These tubes E are connected at their upper ends to and support the hoppers F'. At their lower ends they are preferably provided with detachable mouth-pieces $f$, which may be curved so as to be capable of directing the seed in any given direction, or may be bifurcated or trifurcated, so as to direct the falling seed to two or more places at the same time. Immediately next each of these tubes E is journaled a plain disk-colter or a rotary convexo-concave disk-colter, F, having its convex or its concave surface adjacent to said tube, as desired. The seed from the hopper may be allowed to fall continuously into said tubes, or the usual intermittent supply may be fed thereto. If the latter, any suitable means for accomplishing such intermittent feed will answer. I lay no claim to this, however.

It will be observed from the description and drawings that the series of disks F, being journaled on an axle oblique to the line of draft, makes a furrow wider than the width or thickness of the disk-colter. In order to cover these furrows, I provide a number of caster-wheels, G, having a broad tread. These wheels G are journaled in the extremities of the forks of the pivotal shanks $g$, which have their bearings in the ends of the arms H, which latter are adjustable laterally on the rear transverse bars, C. They are generally adjusted immediately back of and in line with the disk-colters E, so as to cover the furrows made thereby.

It might be preferable to give the caster-wheels G a slight vertical play, so that they can ride over obstacles. To accomplish this, I put a spiral spring, $h$, around the pivotal shank $g$, between the shoulders formed by the forks and the bearings thereof in the end of arm H.

A seat for the driver may be rigged up and supported by arms resting on and secured to the rear transverse bar, C.

If desired, the disks can be utilized for a pulverizer by removing the mouth-pieces of the feed-tubes E and shutting off the supply of seed.

It might be desirable to give the tubes E some vertical play, especially when the hopper is supported on the frame-timbers or gearing of the drill, so that when the disk-colter rolls over an irregular surface, instead of jumping the depressed surfaces, said colter would automatically adapt itself to such irregularity. To accomplish this, I have, as shown in Figs. 4, 5, and 6, provided a shield-shaped frame, I, which has its center open, and is secured to the bottom of the hopper, so that said open center will surround the openings in the hopper through which the seed falls. The rear end of this frame I is divided and provided with lugs, which are pivotally connected to the swivel-block J, placed between said divided ends. Pivoted by means of a vertical pin to said block J, so as to be capable of oscillation laterally, is the tube K, similar to tubes E in every respect, excepting that it is connected or made integral with a bearing, k. In bearing k is journaled the shaft L, on the end of which the rotary disk-colter is fast.

Projecting from the upper surface of tube K, diametrically opposite swivel-block J, is a vertical pin, n, which passes through a segmental slot, m, in frame I, and has a head sufficiently large to prevent its withdrawal through said slot. Beneath said slot I place a washer, and between said washer and the surface of the tube I surround said pin with a coil expansion-spring. When the colter rolls into any irregularity in the ground, the tube oscillates downward, and the colter, journaled in the bearing connected to said tube, adapts itself in this way to the irregularities of the surface.

One of the purposes of the segmental slot m is to permit the adjustment of the disk and colter obliquely to the line of draft. This arrangement may be used, or the other, as hereinbefore explained and described, may be used.

Reference being had to Fig. 2, it will be observed that there is a spout, F', leading from the inner end of the left-hand hopper. Its object is to distribute the grain or seed to avoid "broadcasting." This spout or tube is shown attached to the forward boss b, and from there extending down between the inner rotary colters, F, of both right and left hand axles d. This tube may be attached to the beam A just as well as to the forward boss b.

What I claim as new is—

1. In a grain-drill, the combination, with beam A, bosses b b, and transverse bars B and C, of axle d, tubes E, hopper F', and rotary disk-colters.

2. In a grain-drill, the combination, with beam A, bosses b b, transverse bars B and C, axle d, tubes E, and rotary disk-colter F, of caster-wheels G, adjustable laterally, so as to cover the furrows made by said colters.

3. In a grain-drill, the combination, with rotary disk-colters, of the hopper and seed-tubes E, leading therefrom, having detachable mouth-pieces with one or more openings thereto.

4. In a grain-drill, the combination, with the colters, of the hopper and seed-tubes extending therefrom having detachable mouth-pieces, whose end may be divided, so as to provide several openings, each of which divisions curve in different directions, as and for the purpose set forth.

5. In a grain or seed-drill, the combination, with beam A, forward and rear transverse bars, B and C, and timbers c, connecting the outer ends thereof, of the axles d, secured obliquely to the line of draft between said beam A and timbers c, rotary colter thereon, caster-wheels G, and arms H, adjustable laterally on rear transverse bars, C.

6. In a grain or seed drill, the combination, with beam A, transverse bars B and C, and timbers c, of clevis D, adjustable longitudinally on beam A, axle d, the inner end of which is suitably connected to said clevis, and whose outer end is secured, as described, in timber c, and rotary colter F.

In testimony that I claim the foregoing as my own I hereunto affix my signature in presence of two witnesses.

HENRY C. BEEBE.

Witnesses:
JAMES H. COYNE,
FRANK D. THOMASON.